United States Patent
Yamashita et al.

(10) Patent No.: US 6,203,162 B1
(45) Date of Patent: *Mar. 20, 2001

(54) REFLECTING MIRROR AND FILM AND TELEVISION RECEIVER

(75) Inventors: Takehiko Yamashita, Osaka; Katsuaki Mitani, Ibaraki; Hirokazu Sakaguchi, Toyonaka, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,913

(22) Filed: May 16, 1997

(30) Foreign Application Priority Data

May 17, 1996 (JP) .................................... 8-122953

(51) Int. Cl.[7] .............................. G02B 5/08; G02B 7/182
(52) U.S. Cl. ............................................ 359/883; 359/884
(58) Field of Search .................................... 359/883, 884

(56) References Cited

U.S. PATENT DOCUMENTS

| 4,387,133 | * | 6/1983 | Ichikawa et al. | 428/215 |
|---|---|---|---|---|
| 4,519,678 | * | 5/1985 | Komatsubara et al. | 349/160 |
| 4,687,683 | * | 8/1987 | Ishii et al. | 427/160 |
| 4,731,155 | * | 3/1988 | Napoli et al. | 156/643 |
| 5,051,314 | * | 9/1991 | Ichikawa et al. | 428/522 |
| 5,247,395 | | 9/1993 | Martinez | 359/883 |
| 5,506,642 | | 4/1996 | Suzuki et al. | 353/74 |
| 5,699,188 | * | 12/1997 | Gilbert et al. | 359/584 |

FOREIGN PATENT DOCUMENTS

| 61005986 | 11/1986 | (EP) . |
|---|---|---|
| 4-339642 | 11/1992 | (JP) . |
| 7-230072 | 8/1995 | (JP) . |
| WO 96/10596 | 11/1996 | (WO) . |

OTHER PUBLICATIONS

European search report dated May 06, 1998 corresponding to EP 97 30 3344.

* cited by examiner

Primary Examiner—Cassandra Spyrou
Assistant Examiner—Mark A. Robinson
(74) Attorney, Agent, or Firm—Ratner & Prestia

(57) ABSTRACT

A reflecting film is made by forming resin layers on both sides of a metal thin film, and using a colorless, transparent, and optically isotropic material at least in one resin layer. A reflecting film is made by forming a metal thin film on one side of a resin film, and forming a colorless, transparent, and optically isotropic resin coat layer on its surface by printing or other method. A mirror having such a reflecting film is mounted on a frame. A projection type image magnifying apparatus for liquid crystal panel and a projection type image magnifying apparatus for CRT, improved in resolution and contrast ratio, is obtained by using such mirror as an image reflecting mirror.

19 Claims, 14 Drawing Sheets

REFLECTING MIRROR AND FILM AND TELEVISION RECEIVER

FIELD OF THE INVENTION

The present invention relates to a reflecting film, a mirror using such reflecting film, and a projection type image magnifying apparatus using such mirror as image reflecting mirror.

BACKGROUND OF THE INVENTION

In a projection type image magnifying apparatus (including projection type television receiver), in order to reduce the size of the housing of the apparatus, a method is proposed to install a mirror between the video light emission source (for example, liquid crystal projector) and the projecting screen, and reflect the image by the mirror to project on the screen (see FIG. 7).

As the mirror, hitherto, a glass mirror, or a mirror having a reflecting film forming a reflecting surface mounted on a metal frame by using an adhesive has been used.

The glass mirror, especially a face side mirror (the mirror not allowing the light to pass through the glass which is the support member of the reflecting surface is called a face side mirror) is excellent in smoothness, durability and reflection characteristics, but has a defect of high risk of breakage and is heavy. For example, in the case of a glass mirror used in a 43-inch projection type image magnifying apparatus, the size is 869 mm by 583 mm, and the total weight is over 4 kg including the reinforcing panel for mounting. Hence it does not contribute to reduction of weight and cost of the set.

On the other hand, in the case of a mirror in a reflecting film adhered structure (hereinafter called a film mirror), the weight is about 1 kg in the same size, and the weight is reduced, and it is increasingly used in the projection type image magnifying apparatus.

FIG. 14 shows an example of a configuration of optical parts in a liquid crystal projection type image magnifying apparatus. In FIG. 14, a projection line is projected from a liquid crystal projector 50 using a liquid crystal panel, and reflected by a mirror 49, and a projected image 56 is focused on a screen 48.

However, when a conventional film mirror is used in the mirror 49 as in FIG. 14, the projected image 56 on the screen 48 may be colored, or is separated into rainbow colors.

A sectional view of a reflecting film used in a conventional film mirror is shown in FIG. 11. The reflecting film used in a conventional film mirror is composed of a transparent film 43, on which a metal thin film 42 is evaporated, and the metal surface of the transparent film side is used as the reflecting surface (this mirror is called a back side mirror because the light transmits through the film 43 which is a support member of the reflecting surface). On the opposite side of the transparent film 43 side of the metal thin film 42, a metal thin film of high weather resistance is formed, or a resin-made protective film 41 is formed. That is, the front surface of the metal thin film 42 is a transparent film 43 as the base, and projective means 41 for assuring weather resistance or the like is provided on the rear surface.

In this constitution, an incident light 44 enters the transparent film 43, and is reflected by the metal thin film, and the reflected light 45 passes again through the transparent film 43 and exits.

Herein, problems of light separation and coloring occur in the process of the projected light entering the transparent film, being reflected by the metal surface, and passing again through the transparent film to exit. The reason is discussed below.

FIG. 12 shows an orientation state of a material of transparent film as the base in the prior art. For the transparent film material as the base, as shown in FIG. 12, a wide and long polyester film 46 or the like is used. This polyester film 46 is usually exposed to stretching, more or less, in the manufacturing process of the polyester film 46. As a result, high molecules in the film produce an orientation 47 in the longitudinal direction and width direction of the film. By the orientation of high molecules formed in the film, the film comes to have an anisotropy of rays for causing birefringence of rays. In the case of reflection through a birefringent substance, the reflection is complicated. Birefringence is known to differ in the refractive index of abnormal light when the incident direction is different. In addition, depending on the wavelength of the incident light, the refractive index differs.

Therefore, in the prior art, in the process of passing through the transparent film, entering polarized light, reflecting on the reflecting surface, and leaving from the transparent film, the axis of polarization of the incident polarized light rotates. The situation differs with color. It moreover differs depending on the incident angle and direction to the mirror.

FIG. 13 shows a configuration of electronic parts of a liquid crystal projection type image magnifying apparatus in the prior art. In FIG. 13, the image delivered from a liquid crystal projector 50 is projected by a liquid crystal projector projecting lens 51, reflected by a mirror 49, and magnified and projected on a screen 48. The ray of light passing through the liquid crystal panel and projected from the projector is polarized, either p polarized light or s polarized light.

The ray of light converged on one spot on the screen is the polarized light emitted from the liquid crystal projector being reflected in a wide range of the mirror.

Therefore, when the transparent film stretched in the manufacturing process is used as the film mirror for receiving and reflecting the ray of light in the liquid crystal projector, the imaging on the screen is a synthesis of polarized lights for producing the axes of polarization mutually different in a wide range of mirror, which is a synthesis of complicated images differing in each color.

This is considered because the projected image 56 on the screen 48 is colored, or separated into rainbow colors. In the case of a film mirror as disclosed in Japanese Laid-open Patent No. 4-339642, it is a back side mirror using the ordinary PET film side as mirror, and the above problems occur. As a result, color deviation may occur on the screen, rainbow colors may appear, moire stripes may be formed, or double images or multiple images may be formed.

Moreover, the light is reflected not only on the metal thin film, but also on the PET film surface. Still more, since the PET film has an important role as a support member, it cannot be made too thin, and hence the image appears to be double or multiple images, and the picture quality deteriorates.

Therefore, the conventional film mirror is not suited to the reflecting mirror for liquid crystal projection type image magnifying apparatus.

On the other hand, when using the face side mirror not allowing the light to pass through the film used as the support member of the reflecting surface, the demerits of the back side mirror are eliminated, but when the reflecting surface of the metal thin film is exposed, metal is oxidized, and the reflectivity is lowered, and it gives rise to requirement of protective film of the reflecting surface of the metal thin film, and when a protective film having anisotropy of ray was used as its protective film, the above problems occurred. Besides, development of protective film excellent in weather resistance has been demanded.

SUMMARY OF THE INVENTION

The invention provides a reflecting film having resin layers on both sides of a metal thin film, in which at least one of the resin layers is colorless, transparent, and optically isotropic, and the metal thin film at the side of colorless, transparent and optically isotropic resin layer is used as the reflecting surface. The other resin layer is protective means for assuring weather resistance for projecting the metal thin film and supporting means for supporting the metal thin film.

The mirror using this reflecting film is free from optical anisotropy, and hence problems due to conventional complicated refraction are solved.

The invention is realized by applying the discovery of the fact that the film formed of a resin dissolved in organic solvent by printing method (hereinafter called coat layer) is free from optical anisotropy and is optically isotropic.

To compose the colorless, transparent and optically isotropic resin layer, a metal film is formed on a base film, and materials mentioned in the embodiment are formed by printing or other method. That is, in the case of resin film by printing, it has no optical anisotropy, and the axis of polarization is not rotated.

In the invention, the metal thin film playing the role of reflecting surface is coated with the resin, and the light enters and reflects through this coat layer. Therefore, it is a mode of face side mirror. The transmissivity of the coat layer of film mirror of face side mirror is extremely high as compared with that of the back side mirror having the stretched base film side as the reflecting surface of conventional type. The reason is the thickness of coat layer may be made sufficiently thinner than the base film, and the degree of freedom of selection of material of the coat layer is high, and a material of high transmissivity can be selected. Therefore, since the transmissivity of the coat layer is so high, the reflectivity of the face side mirror is higher than the reflectivity of the back side mirror. Moreover, because of the thin coat layer, if a double image is formed, it is less obvious visibly, and practically troubles of double or multiple images will not occur.

When this mirror is used in the liquid crystal projection type image magnifying apparatus, uneven rainbow colors, moire like unwanted signals, and other deterioration of image quality can be prevented, and double images are not formed, and when used in the CRT projection type image magnifying apparatus, the luminance, resolution, and picture quality can be enhanced.

According to the invention, by a lightweight and inexpensive constitution, not only in the liquid crystal projection type but also in the CRT projection type image magnifying apparatus, an extremely clear image free from color blurring in the reflected image and excellent in contrast and resolution can be presented.

DESCRIPTION OF THE PREFERRED EMBODIMENTS

Figure 1:
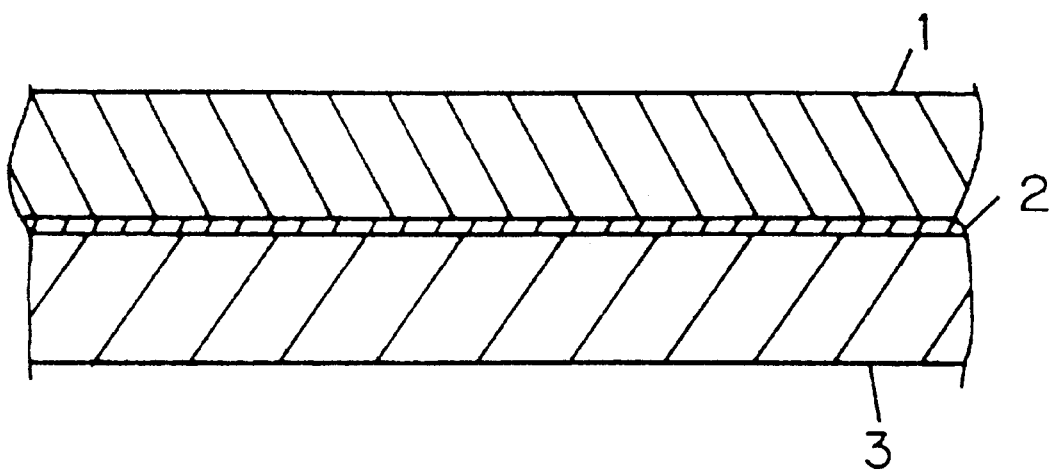
FIG. 1 is a sectional view of a basic composition of a reflecting film of the invention.

FIG. 1 is a sectional view of a basic composition of a reflecting film of the invention. Resin layers 1, 3 are provided on both sides of a metal thin film 2. The one resin layer 1 is colorless, transparent, and optically isotropic, and a mirror is composed by using its metal thin film as the reflecting surface. The role of the other resin layer 3 not used as the reflecting surface of the metal thin film is to protect the metal thin film, and its material may be either same as or different from the resin of the reflecting surface side.

First Exemplary Embodiment

Figure 2:
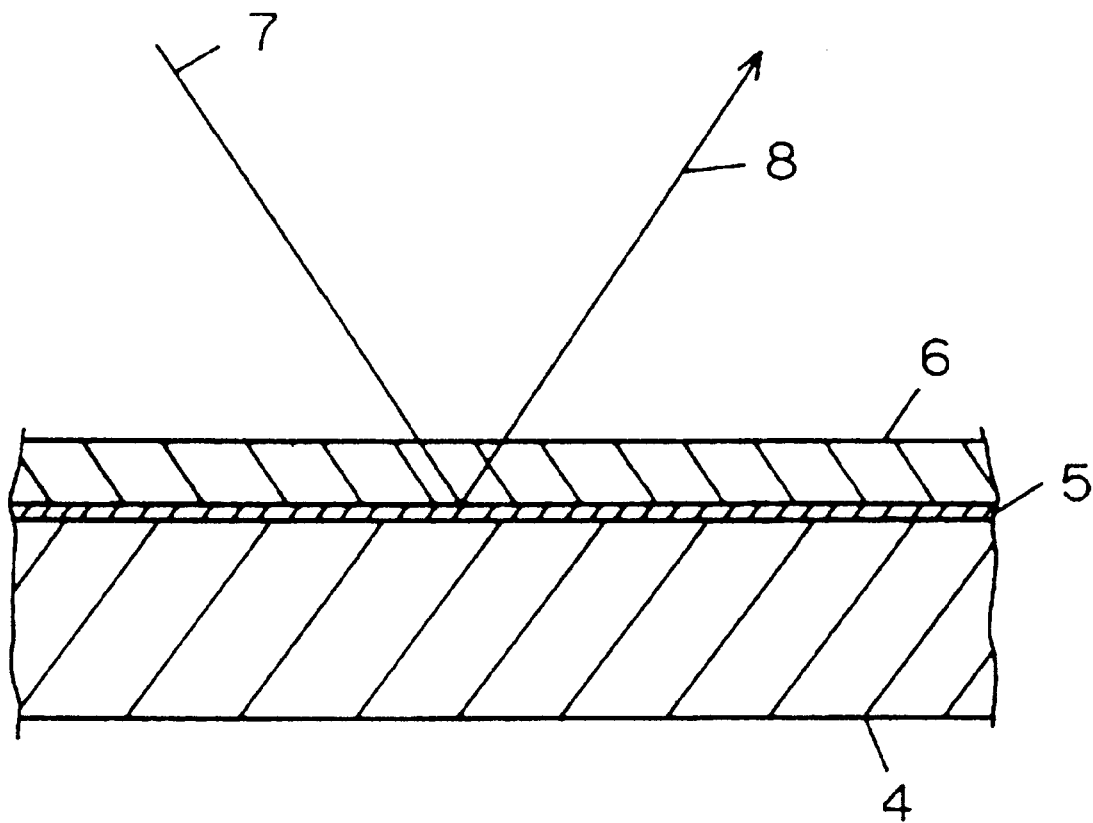
FIG. 2 is a sectional view of a reflecting film in embodiment 1 thereof.

A reflecting film of a first exemplary embodiment of the invention is described by referring to a sectional view in FIG. 2. A metal thin film 5 is formed on a resin film 4 used as the base, and a coat layer 6 is formed thereon. From this coated-form coat layer, an incident light 7 enters, and a reflected light 8 is reflected on the metal thin film 5.

The base resin film 4 is a 25 $\mu$m thick PET film. The thickness is proper in a range of 10 to 100 $\mu$m from the viewpoint of ease of lining with a film, if lining, but the base may be as thick as about 300 $\mu$m in a special case. Meanwhile, if the smoothness and uniformity of the surface are extremely important, it is required to use a film not containing granular ultraviolet ray absorbent, lubricant, or other solid matter that may undulate the film surface.

On this base resin film 4, a thin layer of Ag (silver) was formed as the metal thin film 5 in a thickness of about 100 nm by resistance heating type continuous deposition. A proper thickness of Ag is about 50 nm to 300 nm. If less than 50 nm, the ray reflectivity deteriorates below 80%, and the basic performance as mirror cannot be achieved. If exceeding 300 nm, the film is too tenacious to work smoothly, and obvious folds by wrinkles are likely to be formed. Besides, the cost is increased.

Next, a colorless and transparent resin coat layer 6 was formed by gravure coating method. Using resins of thermoplastic polyester system and thermosetting epoxy-melamine system, a small amount of isocyanate was mixed. They were dissolved in a mixed solvent of methyl ethyl ketone (MEK), butyl acetate, and butyl cellosolve. The heating and curing process after forming the coat film was conducted at 170° C. for 5 minutes.

The thickness of the cured coat layer is 3 μm. This thickness is necessary for preventing oxidation and sulfurization of metal thin film, and it sufficiently satisfies the purpose of protection of surface. The resin film formed by this coat layer shows an optical isotropy. The transparency of this coat film is extremely high, and the transmissivity is over 98%.

The coat layer is composed of polyester system and epoxy-melamine system, but it may be also formed of thermosetting acrylic system, UV curing type polyester system, acrylic system, or epoxy system. As far as it is colorless and transparent and over 97% in transmissivity at coat film thickness of scores of μm, any material can be used.

Second Exemplary Embodiment

Figure 3A:
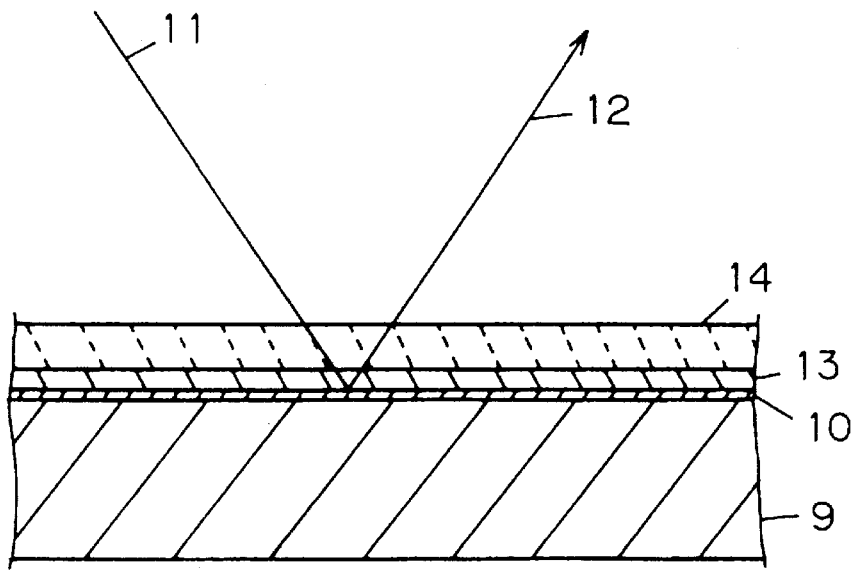
FIG. 3A is a sectional view of a reflecting film in embodiment 2 thereof.
Figure 3B:
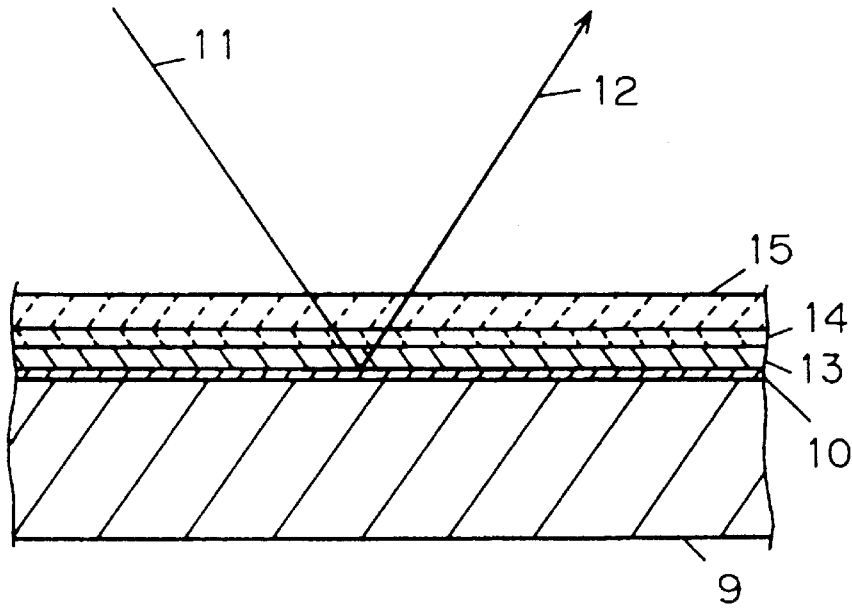
FIG. 3B is a sectional view of a reflecting film in embodiment 3 thereof.

A reflecting film in a second exemplary embodiment of the invention is described by referring to sectional views in FIG. 3A and FIG. 3B. A metal thin film 10 is formed on a base resin film 9, and a first layer 13 of the coat layer is formed thereon, and a second layer 14 of the coat layer is further formed thereon. An incident light 11 enters from the coated surface of two layers of resin in a film form, and transmits through the coat layers 14, 13, and is reflected by the metal thin film 10, and passes again through the coat layers 13, 14, and a reflected light 12 is reflected.

The base resin film 9 was a 25 μm thick PET film. Thereon, a thin layer of Ag was formed as the metal thin film 10 in a thickness of about 100 nm by resistance heating type continuous deposition.

Next, on this metal thin film 10, a first layer 13 of a colorless and transparent resin coat layer was formed by gravure coating method. Using resins of thermoplastic polyester system and thermosetting epoxy-melamine system, a small amount of isocyanate was mixed. They were dissolved in a mixed solvent of methyl ethyl ketone (MEK), butyl acetate, and butyl cellosolve.

The heating and curing process after forming the coat film was conducted at 170° C. for 5 minutes. The thickness of the cured coat layer is 0.3 microns. This thickness is a minimum requirement for preventing oxidation and sulfurization of Ag immediately after deposition of Ag. The transparency of this coat film is extremely high, and the transmissivity is over 98%.

Thereon, a second layer of coat layer 14 was formed. In this case, an acrylic resin and isocyanate were dissolved in the same solvent. This solution was printed by reverse coating method suited to application in a relatively uniform thickness.

Thus is formed a colorless and transparent coat film of a total thickness of about 3 μm of two layers of coat layers 13 and 14. The resin film formed of these coats shows an optical isotropy. These two layers of coat layers 13, 14 present satisfactory characteristics from the viewpoint of prevention of oxidation and protection of surface of the metal thin film 10.

Figure 10:
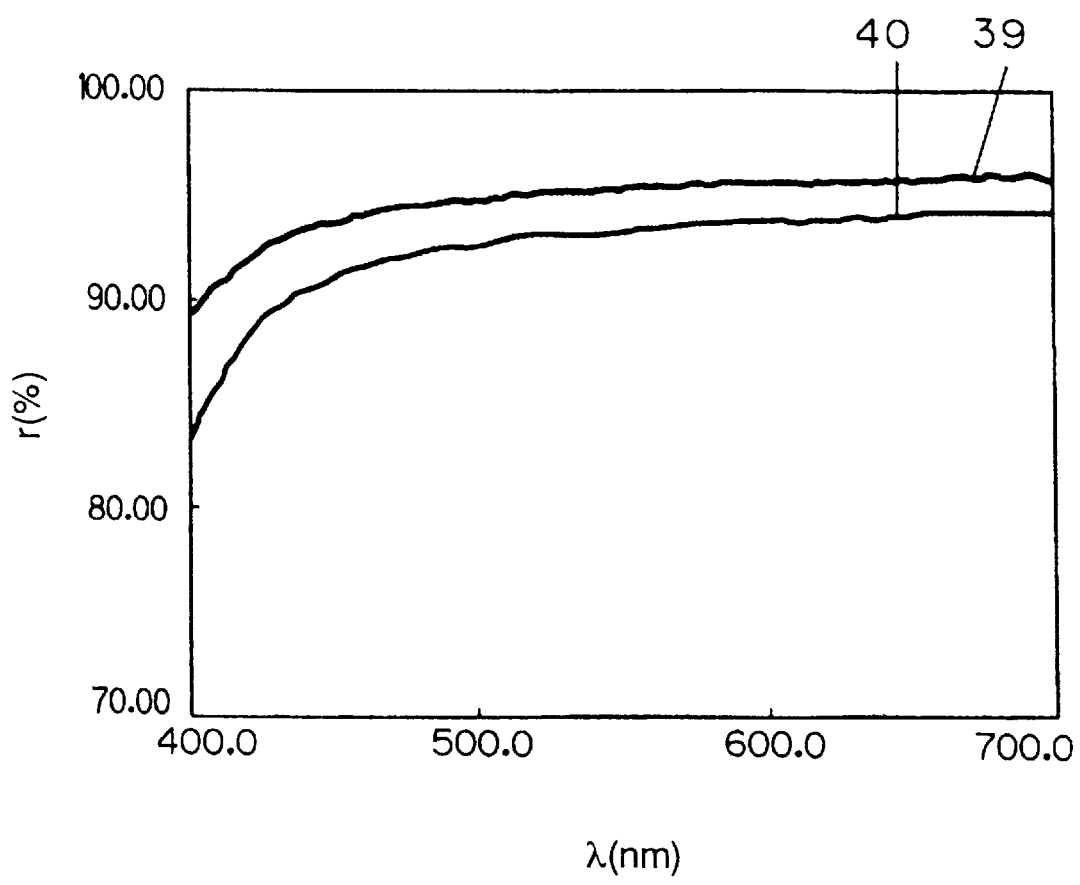
FIG. 10 is a diagram of reflectivity of ray of light of the reflecting films in embodiments 1, 2, 3, and 4.
Figure 11:
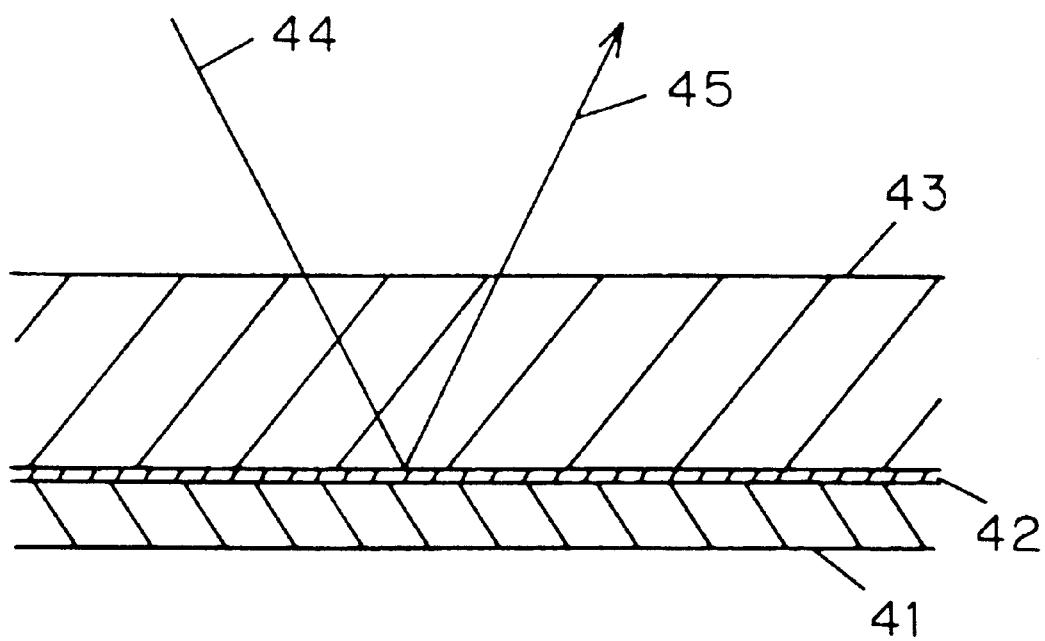
FIG. 11 is a sectional view of a transparent film used in a film mirror in prior art.
Figure 12:
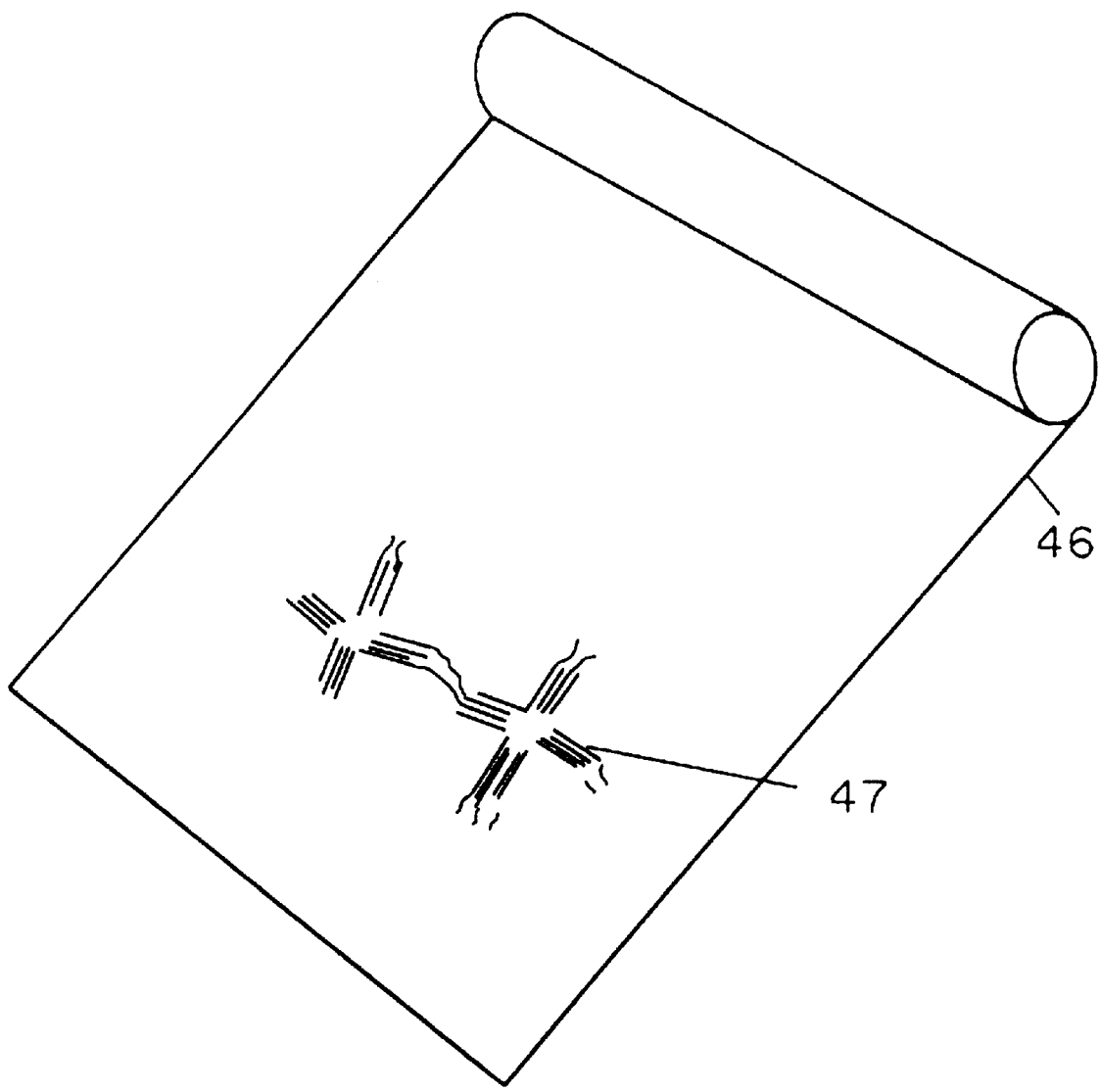
FIG. 12 is a diagram of orientation state of film material of the base in prior art.
Figure 13:
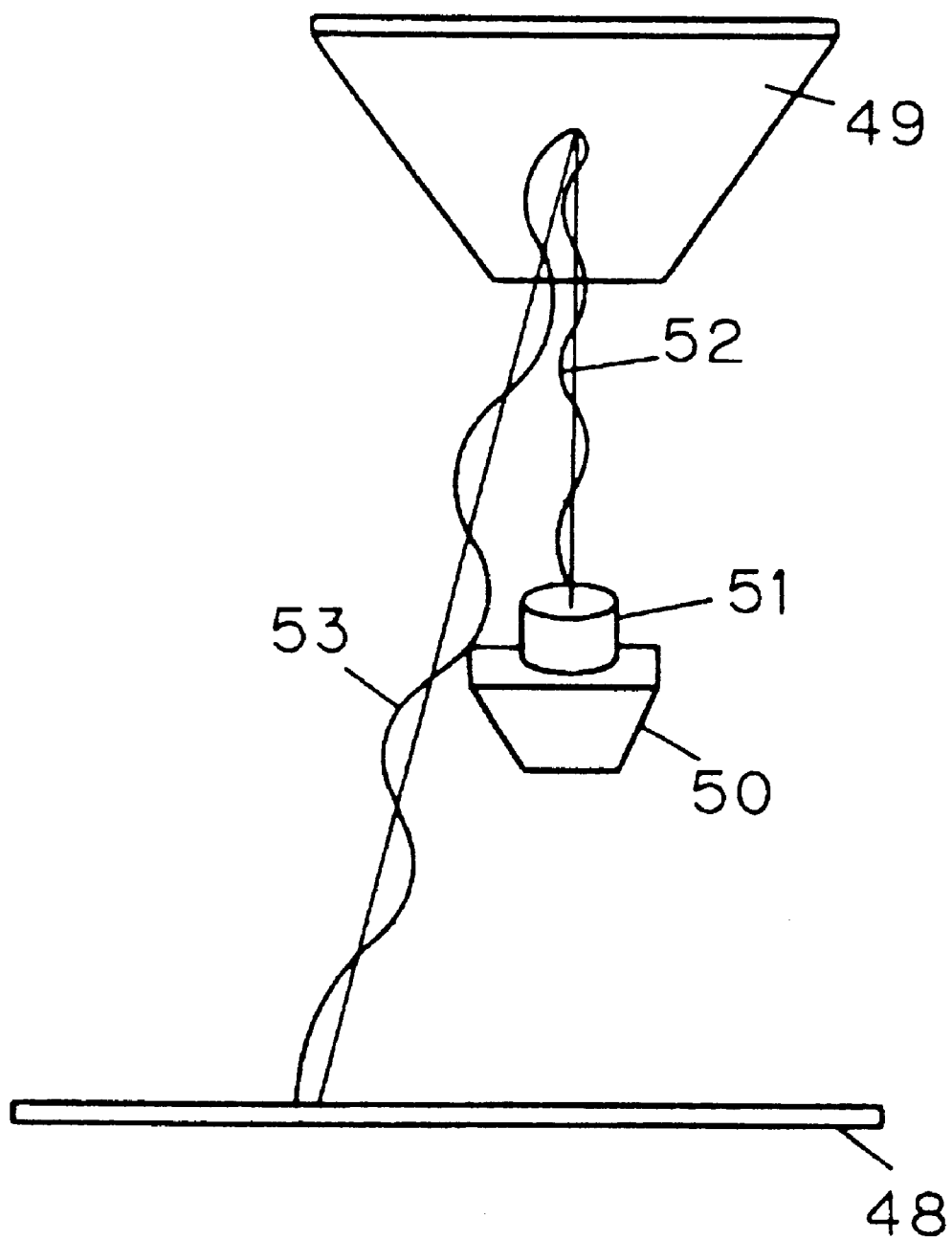
FIG. 13 is optical parts layout 1 of the liquid crystal projection type image magnifying apparatus in prior art.
Figure 14:
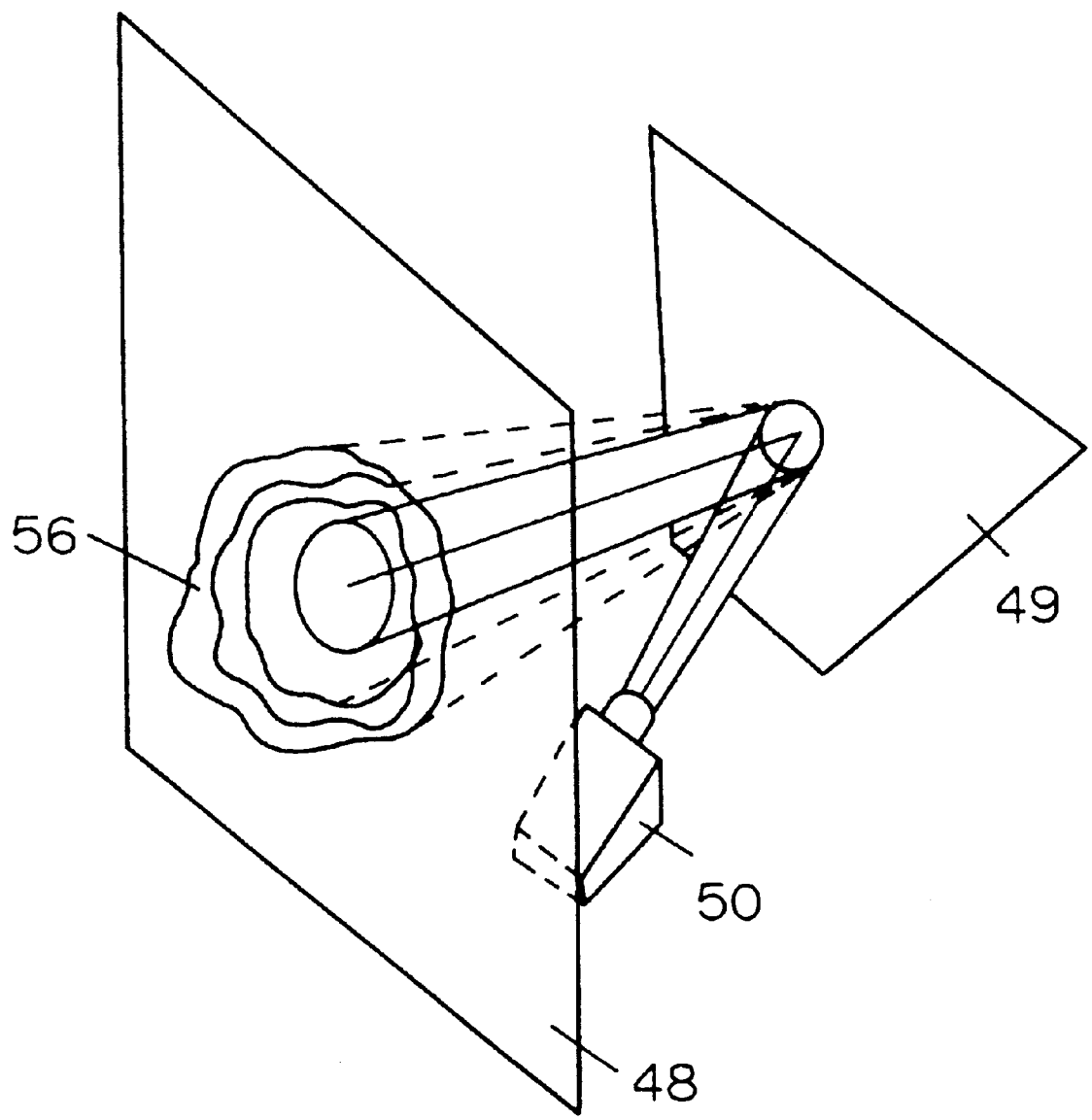
FIG. 14 is optical parts layout 2 of the liquid crystal projection type image magnifying apparatus in prior art.

The reflecting film manufactured in the above conditions was proved to be a film showing a reflectivity of r=95% (at wavelength λ=550 nm) as indicated by reference numeral 39 in FIG. 10 (by total reflection measurement by UV3000 integral spheres by Shimadzu Corporation).

Then, this layer was checked for coat film defects such as pin holes by salt spray test. In this test, a cycle of 16 hr of salt spray and 8 hr of no spray was repeated.

As a result, in the case of samples without these coats 13, 14, Ag flowed out by corrosion after 5 cycles, while the coated samples were completely unchanged in appearance and reflectivity after 50 cycles, and hence it was considered that there were no pin holes.

Further, by continuous high humidity test of 60° C. and 90% RH, continuous high temperature test of 60° C., continuous low temperature test of −40° C., and heat cycle test of −20° C. to 60° C. for 1400 hr, the reflectivity was not changed from the initial value, and it was extremely stable.

Third Exemplary Embodiment

A reflecting film of a third exemplary embodiment of the invention is described by referring to the sectional view in FIG. 3B. In FIG. 3B, a third coat layer 15 is further formed on the film of the second exemplary embodiment in FIG. 3A. The material of the third coat layer 15 is same as that of the second layer 14 of the coat layers. The total thickness of three coat layers 13, 14, 15 is 5 microns. In particular, when used in severe environments, the reliability of environmental resistance can be further enhanced.

In the description of the first to third exemplary embodiments, Ag is used as the metal thin film, but Al (aluminum) may be also used. In this case, the reflectivity is inferior by several percent, but it is sufficiently usable depending on the application. FIG. 10 shows the difference in reflectivity between the Ag thin film and Al thin film, and proves that the reflectivity 40 of Al is inferior to the reflectivity 39 of Ag.

As the base resin films 4, 9, PET films are used, but it is not necessary to be transparent and any color may be used. Not limited to PET, polycarbonate, polybutylene terephthalate, PEN, and others may be used, as far as they are free from solid matter causing undulations of the film such as granular ultraviolet ray absorbent and lubricant, smooth in surface, durable to withstand curing temperature of coat, and stable for a long period to endure specific tension.

As the metal thin film forming method, resistance heating type continuous deposition is shown, but it may be similarly formed by other methods, including induction heating method, electron beam heating method, other continues deposition method, and sputter continuous deposition method, among others.

As the coat material, resins of thermoplastic polyester system and thermosetting epoxy-melamine system, and resins of isocyanate and acrylic system are shown, but any other resins may be used as far as the ray transmissivity of the coat film alone is over 95% at coat film thickness of several microns, and the weather resistance is excellent. Or these resins may be properly mixed.

These resins are dissolved in a mixed solvent of methyl ethyl ketone (MEK), butyl acetate and butyl cellosolve, but, alternatively, alcohol and ether can be similarly used as far as the resins can be dissolved sufficiently, and the viscosity and thixotropy suited to various printing machines are obtained.

As the method for printing these resins, aside from the gravure coating method and reverse coating method explained above, roll coater method, dipping method, die coating method, and other methods are similarly applicable as far as the resins can be continuously printed on a film uniformly in the micron unit.

Fourth Exemplary Embodiment

Figure 4:
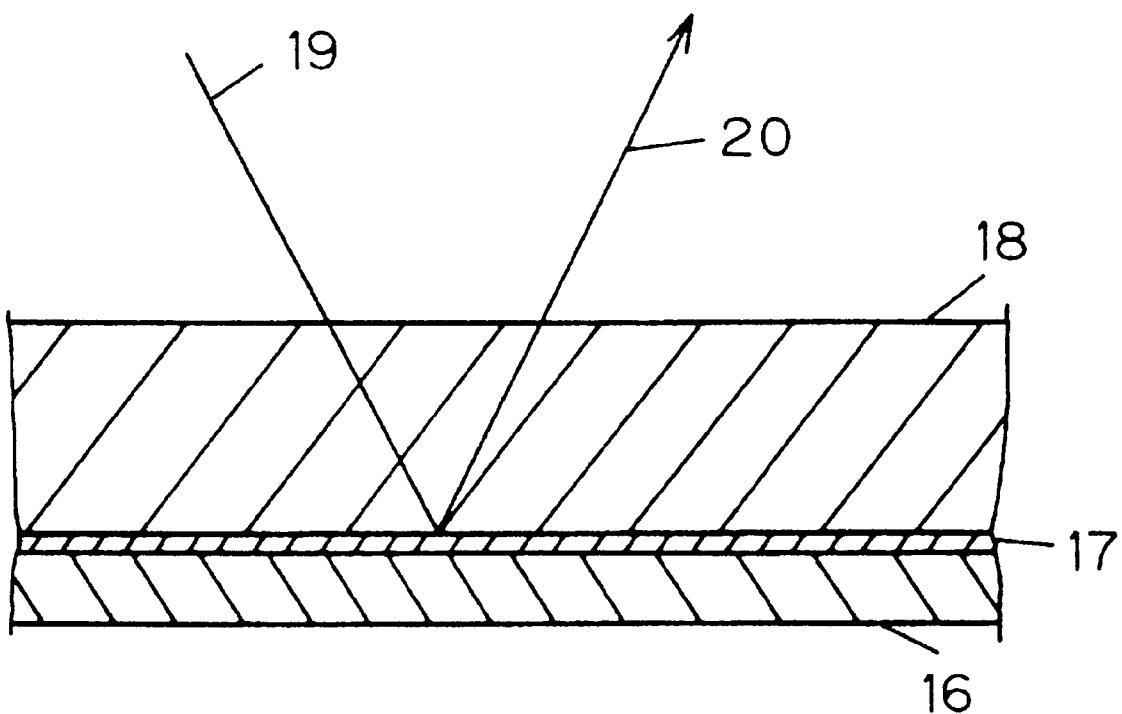
FIG. 4 is a sectional view of a reflecting film in embodiment 4 thereof.

FIG. 4 is a sectional view of a fourth exemplary embodiment of reflecting film. The first to third embodiments refer to the face side mirror, while the fourth embodiment represents the back side mirror. On an optically isotropic, colorless, transparent, 25 μm thick PET film 18 without orientation and stretching, a thin film 17 of Ag was formed in a thickness of 100 nm same as in the first to third embodiments.

A protective film 16 was formed by printing for the purpose of surface protection and weather resistance of the metal thin film 17. In this constitution, the PET film side is used as the reflecting surface.

Instead of PET as the material for the film, meanwhile, other material may be used as far as the film material is free from orientation in the high molecules, not stretched in the manufacturing process, colorless and transparent, and optically isotropic.

Fifth Exemplary Embodiment

Figure 5A:
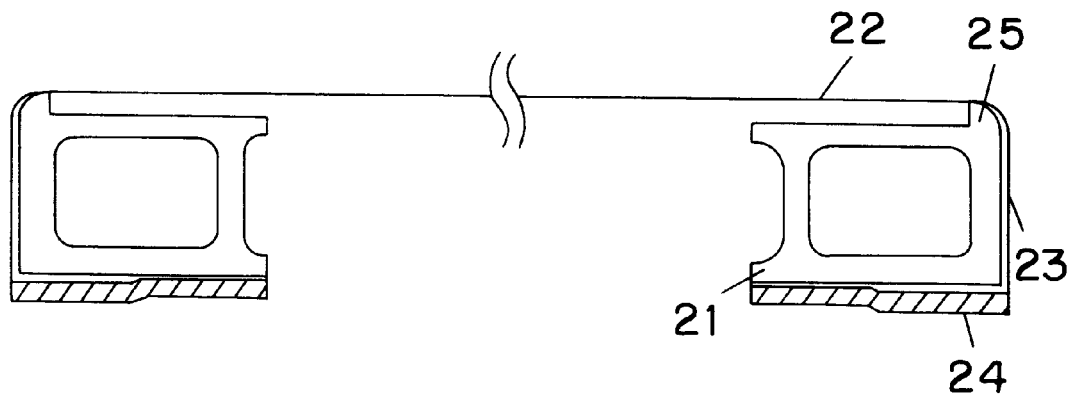
FIG. 5A is a side view of a mirror in embodiment 5 thereof.
Figure 5B:
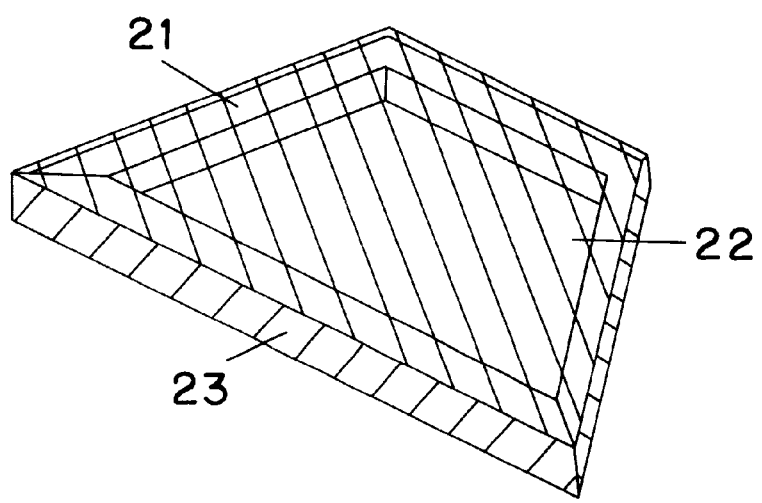
FIG. 5B is a perspective view of the mirror in embodiment 5 thereof.

The reflecting films explained in the first to fourth embodiments were adhered by using an adhesive (Konishi G5800 rubber adhesive, in a thickness of about 10 μm), with a tension applied to the side 23 of an aluminum frame 21 as shown in FIG. 5A. The reflecting films were turned to the back side of the aluminum frame 21, and the end portions of the reflecting films were adhered by using an adhesive tape 24. At this time, the reflecting film is defined in height by a rib 25 of 2 mm in height and 3 mm in thickness provided on the outer circumference of the aluminum frame 21, and the whole circumference of the aluminum frame is an effective area of mirror. This rib 25 has a curvature for the ease of sliding when lining with the reflecting film 22. A perspective view of thus manufactured mirror is shown in FIG. 5B.

As the tension, a pressure of 30 g/cm2 is applied in a disk of 25 mm in diameter in the central part, at ordinary temperature, in the case of a trapezoidal frame measuring 690 mm in upper bottom, 960 mm in lower bottom, and 520 mm in height, and sinking is measured. The sinking value at ordinary temperature is in a range of 3 mm to 7 mm. The aluminum frame is drawn out continuously from a die in a sectional shape as shown in FIG. 5A, and is manufactured into a long square member. It is cut in a specific length in a oblique cut section, and butts are joined, welded, and a trapezoidalaluminum frame 21 is prepared. The required flatness is 1 mm or less when placed on a surface plate with the rib 25 downward.

Figure 9:
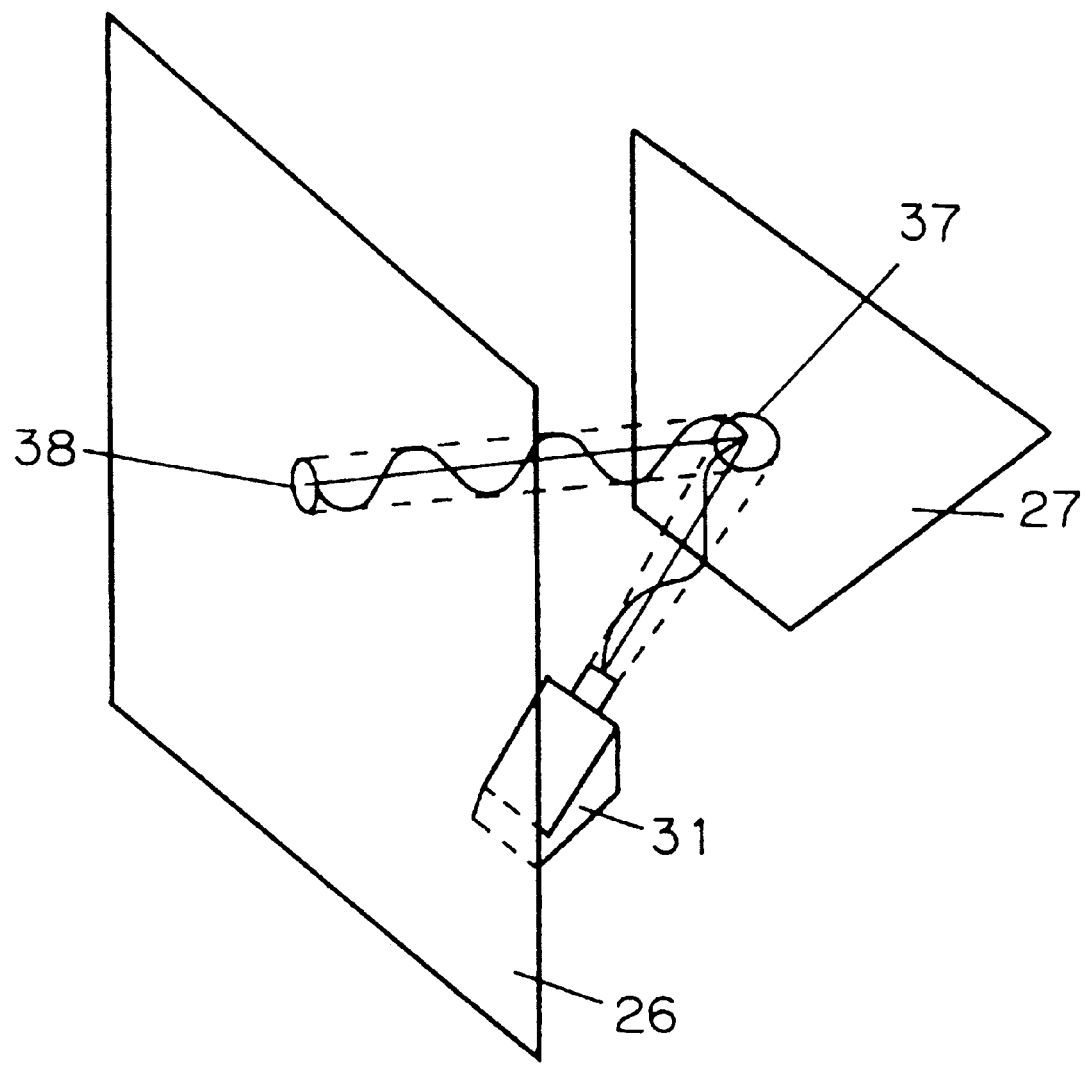
FIG. 9 is optical parts layout 2 of the liquid crystal projection type image magnifying apparatus in embodiment 5.

Using thus manufactured mirror 27, the image of a liquid crystal projector 31 was reflected as shown in FIG. 9, and the image was projected on a transmission type screen 26. As a result, the reflected image 38 was a very sharp image free from rainbow blurringor moire.

Figure 8:
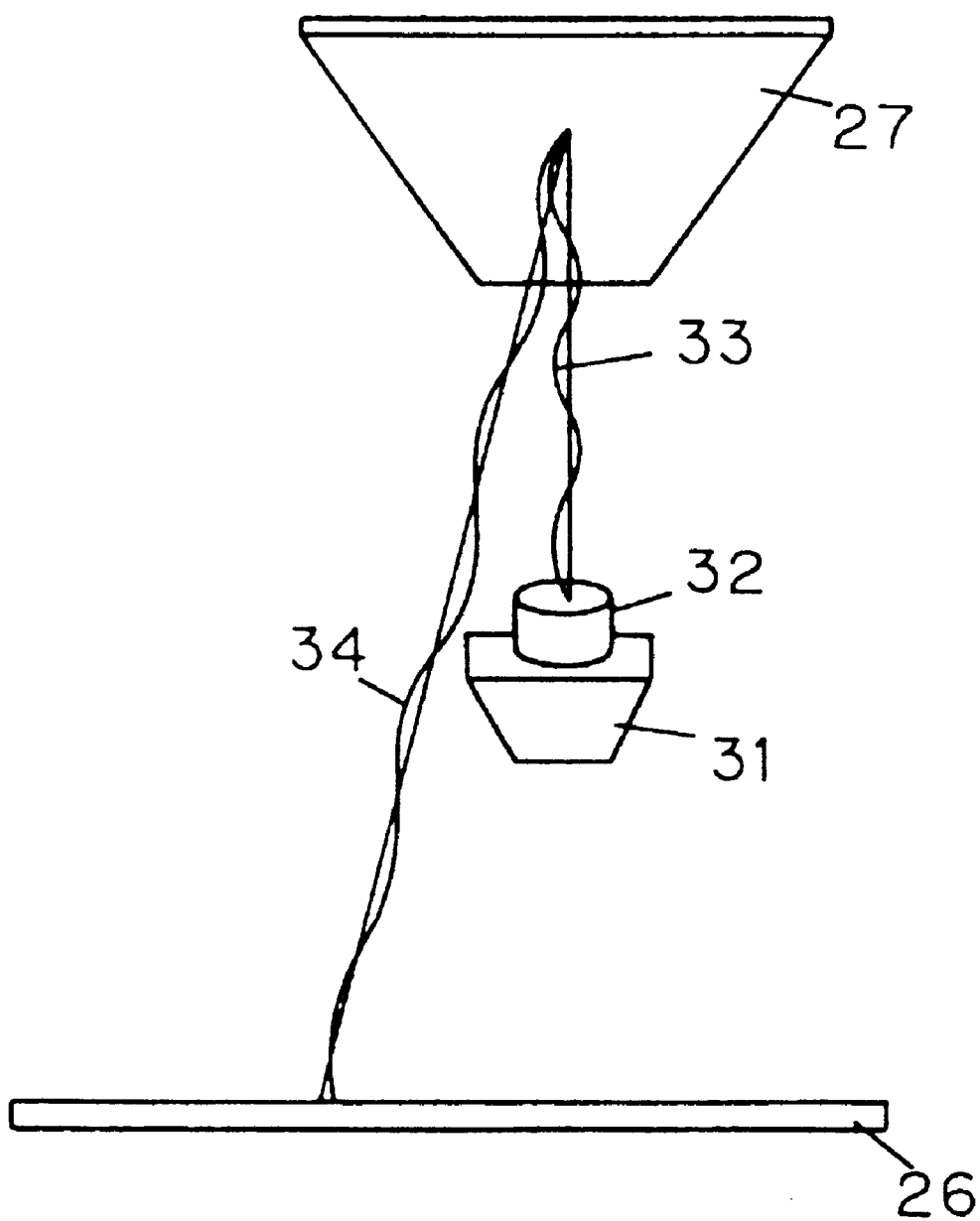
FIG. 8 is optical parts layout 1 of the liquid crystal projection type image magnifying apparatus in embodiment 5.

This is because, as shown in FIG. 8, the axis of polarization of the projected light 33 leaving the liquid crystal projector 31 is identical with the axis of polarization of the reflected light 34. That is, the angle of axis of polarization is not changed by mirror reflection.

Figure 6:
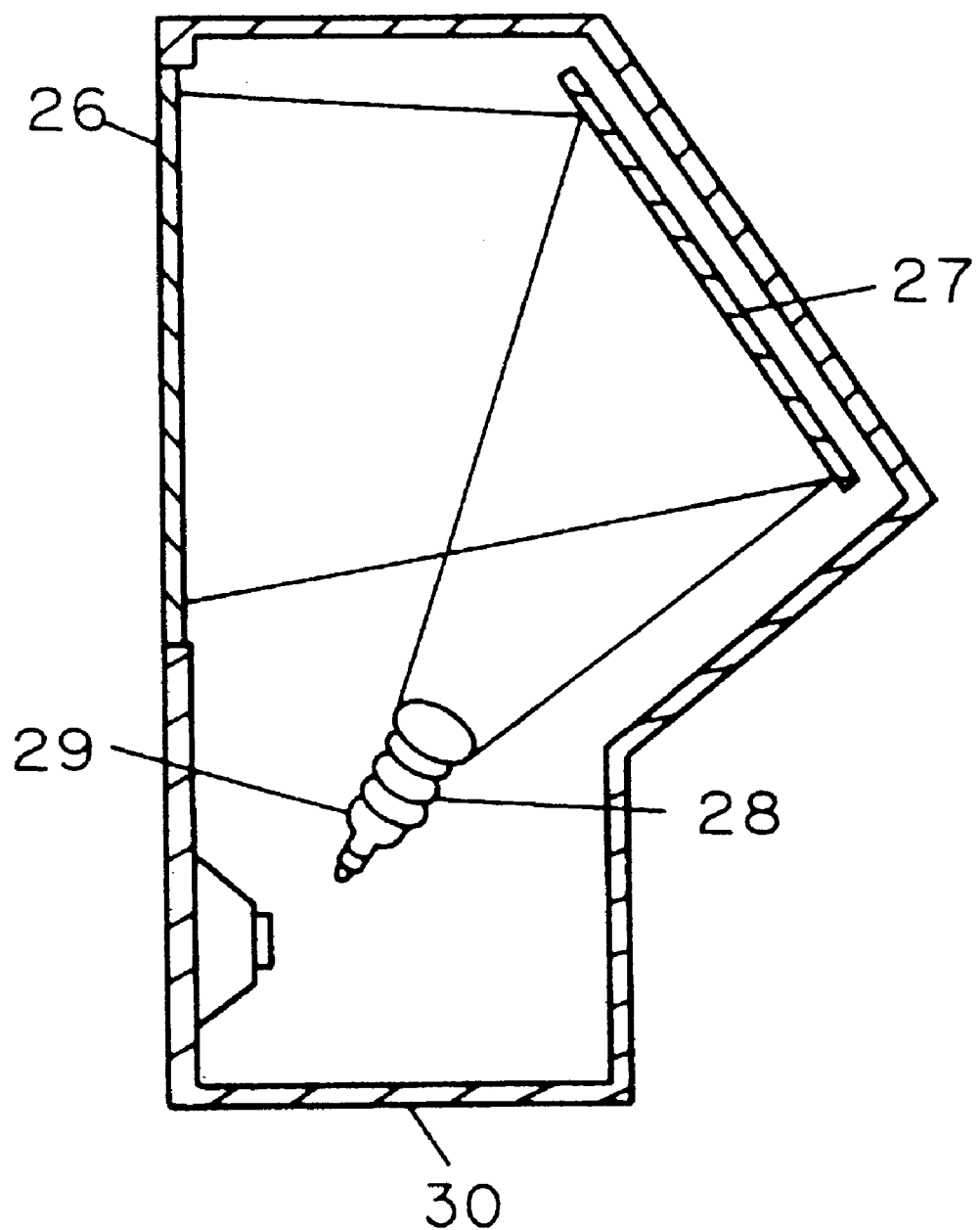
FIG. 6 is a CRT projection type image magnifying apparatus using the mirror of the invention.
Figure 7:
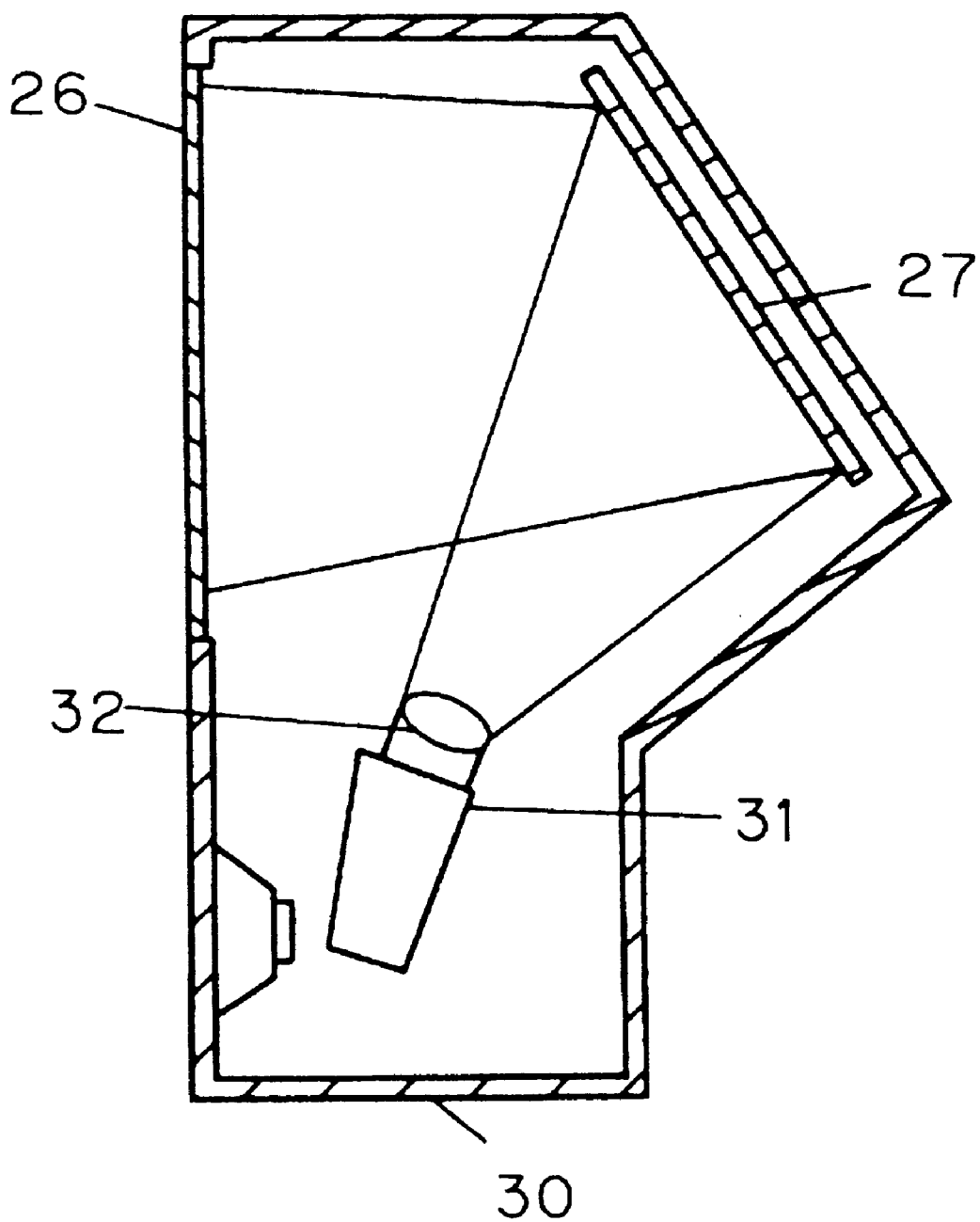
FIG. 7 is a liquid crystal projection type image magnifying apparatus using the mirror of the invention.

FIG. 7 shows a 48-inch liquid crystal projection type image magnifying apparatus. In FIG. 7, reference numeral 26 is a screen, 27 is a mirror, 30 is a housing, 31 is a liquid crystal projector, and 32 is a lens. FIG. 6 shows a 48-inch CRT projection type image magnifying apparatus.

In FIG. 6, reference numeral 26 is a screen, 27 is a mirror, 30 is a housing, 29 is a CRT projector, and 28 is a lens.

The mirror of the invention was installed in the 48-inch projection type image magnifying apparatus as shown in FIG. 6 and FIG. 7, a specified image pattern was displayed, the luminance in the black display area and white display area was measured, and the ratio was determined. The ratio of white luminance to black luminance is called the contrast. As a result, the mirror of the invention indicated 38.2 as compared with 34.5 of the conventional mirror. Hence, it was confirmed that the contrast was improved about 10%.

Moreover, a specified resolution evaluation chart was displayed, and in the central area of the screen, in the conventional mirror, the resolution was about 440 lines, while 470 lines were confirmed in the mirror of the invention. It corresponds to an improvement of about 6.8%.

The method of installing the mirror in the aluminum frame is not limited to the illustrated method. Alternatively, the film mirror may be fixed to the top or back of the frame by means of an adhesive, or instead of using adhesive, the reflecting film may be fastened to the frame by using a metal frame as if stretching a drumhead over an end of a cylinder.

The frame material is not limited to aluminum, but lightweight metal such as Ti and Ni, or resin may be used, and it may be also realized by any other lightweight and rigid material such as polymer alloy and polymer containing glass fiber.

By mounting thus prepared mirror on the projection type image magnifying apparatus as shown in FIG. 6 and FIG. 7, an image of higher clarity and better resolution can be obtained at lower cost than in the prior art, and it can be also applied to the hitherto difficult liquid crystal projection type image magnifying apparatus. It also contributes greatly to reduction of the product weight.

What is claimed is:

1. A reflecting film for projection type image magnifying apparatus, said reflecting film comprising a metal thin film and resin layers on both sides of the metal thin film, wherein at least one of the resin layers is optically isotropic and formed of a resin dissolved in an organic solvent without containing particle matter, said metal thin film is in contact with said optically isotropic layer.

2. A method of making a reflecting film for projection type image magnifying apparatus, said method comprising the steps of:

forming a metal thin film on one side of a resin film, and forming a coat layer of optically isotropic resin on the exposed surface of the metal thin film by applying and curing a material dissolved in an organic solvent without containing particle matter.

3. A method of making a reflecting film for projection type image magnifying apparatus, said method according to claim 2, wherein the coat layer is formed by mixing at least one of an acrylic system, a melamine system, and a polyester system.

4. A method of making a reflecting film for projection type image magnifying apparatus, said method according to claim 2, wherein the step of forming the coat layer further comprises the step of forming at least two layers.

5. A method of making a reflecting film for projection type image magnifying apparatus, said method according to claim 2, wherein the metal thin film including Ag or Al with a reflectivity in the visible ray region in a range of 85 to 99%.

6. A method of making a reflecting film for projection type image magnifying apparatus, said method according to claim 2, wherein the resin film comprises one of PET, PMMA and PC without containing particle matter.

7. A method of making a reflecting film for projection type image magnifying apparatus, said method according to claim 2, wherein the step of forming the metal thin film on one side of the resin film further comprises applying the metal thin film with a thickness in the range of 50 nm to 500 nm and using a resin including one of PET, PMMA and PC without containing particle matter with a thickness in a range of 10 µm to 300 µm, and the step of forming the coat layer further comprises applying an optically isotropic resin with a thickness of 1 µm to 20 µm on the metal thin film.

8. A method of making a reflecting film for projection type image magnifying apparatus, said method comprising the steps of:

providing an optically isotropic resin film by dissolving a resin in an organic solvent without containing particle matter, forming a metal thin film on one side of the optically isotropic resin film, forming a protective film made of resin on the exposed side of the metal thin film, and mounting the optically isotropic resin film side within an apparatus for receiving and reflecting an image;

wherein said metal thin film is in contact with said optically isotropic resin film.

9. A method of making a reflecting film for projection type image magnifying apparatus, said method according to claim 8, wherein the resin film has a thickness in a range of 10 µm to 300 µm, the metal thin film has a thickness of 50 nm to 500 nm, and the protective film has a thickness of 1 µm to 20 µm.

10. A reflecting film for projection type image magnifying apparatus, said reflecting film prepared in accordance with the method of claim 8, wherein the resin film is one of PET, PMMA and PC.

11. A reflecting film for projection type image magnifying apparatus, said reflecting film prepared in accordance with the method of claim 8, wherein the protective film is composed of a optically isotropic resin without containing particle matter.

12. A reflecting film for projection type image magnifying apparatus, said reflecting film prepared in accordance with the method of claim 8, wherein the protective film is formed by mixing at least one of an acrylic system, a melamine system, and a polyester system without containing particle matter.

13. A reflecting film for projection type image magnifying apparatus, said reflecting film prepared in accordance with the method of claim 8, wherein the metal thin film is made of Ag or Al with a reflectivity in the visible ray region in a range of 85 to 99%.

14. A mirror mounted on a frame for projection type image magnifying apparatus, said mirror comprising:

a metal thin film, a resin film on one side of the metal thin film, and an optically isotropic layer on another side of the metal thin film, the optically isotropic layer formed of a resin dissolved in an organic solvent system without containing particle matter wherein said metal thin film is in contact with said optically isotropic layer.

15. A projection type image magnifying apparatus for CRT comprising:

a mirror mounted on a frame wherein the mirror comprises:

a first resin layer, a metal film above the first resin layer, a second resin layer above the metal film, wherein at least one of the resin layers is an optically isotropic film formed of a resin dissolved in an organic solvent without containing particle matter, said metal thin film is in contact with said optically isotropic layer.

16. A projection type image magnifying apparatus for liquid crystal panel comprising:

a mirror mounted on a frame wherein the mirror comprises:

a metal film;

a first resin layer on one side of the metal film, and a second resin layer on another side of the metal film, wherein at least one of the resin layers is an optically isotropic film formed of a resin dissolved in an organic solvent without containing particle matter, said metal thin film is in contact with said optically isotropic layer.

17. A reflecting film for projection type image magnifying apparatus, said reflecting film comprising a metal thin film and resin layers on both sides of the metal thin film, wherein at least one of the resin layers is optically isotropic solvent without containing particle matter, said metal thin film is in contact with said optically isotropic layer and formed of a resin dissolved in an alcohol.

18. A mirror mounted on a frame for projection type image magnifying apparatus, said mirror comprising:

a metal thin film, a resin film on one side of the metal thin film, and an optically isotropic layer on another side of the metal thin film, the optically isotropic layer formed of a resin dissolved in an alcohol, said resin without containing particle matter;

wherein said metal thin film is in contact with said optically isotropic layer.

19. A method of making a reflecting film for projection type image magnifying apparatus, said method comprising a metal thin film and resin layers on both sides of the metal thin film, by forming at least one of the resin layers by coating a resin dissolved in an organic solvent without containing particle matter wherein at least one of the resin layers is optically isotropic and said metal thin film is in contact with said optically isotropic layer.

* * * * *